(12) United States Patent
Aiken, Jr. et al.

(10) Patent No.: US 6,425,014 B1
(45) Date of Patent: Jul. 23, 2002

(54) METHODS, SYSTEMS AND COMPUTER PROGRAM PRODUCTS FOR PROVIDING NETWORK CONNECTION INFORMATION IN A CLUSTER OF DATA PROCESSING SYSTEMS

(75) Inventors: John Andrew Aiken, Jr., Raleigh, NC (US); Michael Edward Baskey, Wappingers Falls, NY (US); Sue L. Huang, Raleigh, NC (US); Gary S. Puchkoff, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/401,417

(22) Filed: Sep. 22, 1999

(51) Int. Cl.[7] .................................. G06F 15/16
(52) U.S. Cl. ................ 709/230; 709/249; 709/250
(58) Field of Search ................ 709/230, 249, 709/250, 227, 219, 238

(56) References Cited

U.S. PATENT DOCUMENTS

| | | | | | |
|---|---|---|---|---|---|
| 5,699,500 A | * | 12/1997 | Dasgupta | .................... | 395/180 |
| 5,805,572 A | * | 9/1998 | Bernabeu-Auban et al. | | 370/255 |
| 5,946,685 A | * | 8/1999 | Cramer et al. | ................. | 707/10 |
| 6,006,259 A | * | 12/1999 | Adelman et al. | ........... | 709/223 |
| 6,092,166 A | * | 7/2000 | Bobak et al. | ................ | 711/169 |
| 6,170,045 B1 | * | 1/2001 | Bobak et al. | ................ | 711/169 |

OTHER PUBLICATIONS

IBM OS/390 Version 2 Release 6 Availability and Release 7, *IBM Software Announcement*, Aug. 18, 1998.

* cited by examiner

*Primary Examiner*—Zarni Maung
(74) *Attorney, Agent, or Firm*—Myers Bigel Sibley & Sajovec, P.A.; Jerry W. Herndon (57) ABSTRACT

Methods, systems and computer program products are provided which provide connection information about connections to communication protocol stacks in a cluster of data processing systems by distributing location information between communication protocol stacks in a group of stacks within the cluster. The distributed location information about addresses and operating system images or data processing systems of communication protocol stacks is utilized to generate a list of addresses corresponding to stacks in the group so that this information may be provided to applications requesting the information from the communication protocol stacks.

19 Claims, 6 Drawing Sheets

METHODS, SYSTEMS AND COMPUTER PROGRAM PRODUCTS FOR PROVIDING NETWORK CONNECTION INFORMATION IN A CLUSTER OF DATA PROCESSING SYSTEMS

FIELD OF THE INVENTION

The present invention relates to network connections in general and in particular to network connections and routing paths associated with a cluster of data processing systems.

BACKGROUND OF THE INVENTION

In many network environments, data processing systems operate in a cluster of data processing systems. For example, International Business Machines Corporation's SYSPLEX provides of cluster of OS/390 computers or operating system images. Often, applications executing on the data processing systems in the cluster of data processing systems may wish to communicate both with data processing systems inside and outside the cluster.

For example, a server application executing on a data processing system in the cluster may receive a request from a client outside the cluster. This request may be for information provided by a second application executing on a different data processing system in the cluster. The server may then send a request or otherwise access the second application executing on the different data processing system in the cluster. If the initial request from the client was a secure request, then the request to the second application may also need to be a secure request.

However, the same security protocols used to communicate with the client outside the cluster may not be needed to communicate with the second application within the cluster if the connection to the data processing system associated with the second application is trusted. For example, the connection between the data processing systems may be trusted if the data processing systems are in the same location and, therefore, the connection between the data processing systems may have only minimal risk of eavesdropping by an unauthorized party. The overhead associated with the security protocol on the connection between the first application and the second application may be avoided if the first application is made aware that the second application is connected over a trusted connection.

Thus, it may be beneficial to be able to provide connection information to applications so that the applications may tailor their operations for increased efficiency based on the connection information. In light of the above discussion, a need exists for an efficient mechanism to provide network connection information to applications executing in a cluster of computers or data processing systems.

SUMMARY OF THE INVENTION

Accordingly, it is an object of the present invention to provide methods, systems and computer program products which can provide connection information about network connections to data processing systems in a cluster of data processing systems.

A further object of the present invention is to allow for the automatic maintenance of such information so as to allow the information to be provided to applications executing in a cluster of data processing systems.

A still further object of the present invention is to allow for the automatic updating of such connection information so as to maintain the currency of the information.

A still further object of the present invention is to allow for differing configurations of data processing systems to provide connection information to applications.

These and other objects of the present invention may be provided by systems, methods, and/or computer program products which provide connection information about connections to communication protocol stacks in a cluster of data processing systems by distributing location information between communication protocol stacks in a group of stacks within the cluster. The distributed location information about addresses and operating system images or data processing systems of communication protocol stacks is utilized to generate a list of addresses corresponding to stacks in the group so that this information may be provided to applications requesting the information from the communication protocol stacks.

By establishing a group of communication protocol stacks in the cluster, connection information provided to an application may be tailored to the specific configuration of a cluster of data processing systems. Furthermore, by utilizing the communication protocol stacks to distribute location information between themselves, the connection information may be kept current by distributing changes between the communication protocol stacks. Such information exchange may be made automatically without operator intervention by distributing such information when a communication protocol stack joins the group, has a change in its configuration or leaves the group. Also, by maintaining the information at each communication protocol stack in the group, connection information may be maintained accessible to applications without requiring the overhead of accessing a central monitoring function or repository for information about connections and without requiring each application to maintain a copy of the connection information.

Particular embodiments of the present invention include methods, systems and/or computer program products for generating connection information associated with a connection from a first communication protocol stack by establishing a group of communication protocol stacks associated with a cluster of data processing systems. The first communication protocol stack is in the group of communication protocol stacks. Location information is distributed between the first communication protocol stack and other communication protocol stacks in the group of communication protocol stacks so as to provide location information to each communication protocol stack in the group of communication protocol stacks which identifies the location of each communication protocol stack in the group of communication protocol stacks.

The first communication protocol stack may then generate a list of locations which are associated with the group of communication protocol stacks based on the distributed location information. Utilizing the generated list, it may be determined if the connection from the first communication protocol stack is to a location in the list of locations and connection information generated specifying the connection as within the cluster of data processing systems if such is the case. The connection information may be returned to an application associated with the first communication protocol stack in response to receiving a request for connection information from the application.

In yet another embodiment of the present invention, a plurality of groups of communication protocol stacks is established and the first communication protocol stack is a member of at least two of the groups. In such a case, information may be distributed about members of each group and lists generated identifying locations in the groups. Connection information which specifies the group which includes the source and destination may then be provided to a requesting application.

In a further embodiment, the location information comprises routing addresses associated with communication protocol stacks in the group of communication protocol stacks. In such an embodiment, a list of routing addresses associated with the group of communication protocol stacks may be generated based on the distributed location information. Then, the determination of whether the connection is to a location in the group may be accomplished by determining if at least one of a source or a destination routing address associated with the connection is included in the list of routing addresses. It may be further determined the route associated with the connection is a one hop route.

The location information may also include a data processing system identifier associated with communication protocol stacks in the group of communication protocol stacks. In such an embodiment, a list of data processing systems associated with the group of communication protocol stacks may be generated based on the distributed location information. Furthermore, it may then be determined if both a source and a destination routing address associated with the connection are associated with the same data processing system. In particular, the data processing system information may be an MVS image identifier.

In a further embodiment of the present invention, the location information is distributed by the first communication protocol stack by joining the group of communications protocol stacks and then broadcasting to other communication protocol stacks in the group of communication protocol stacks a location information message containing location information associated with the first communication protocol stack. The first communication protocol stack also receives location information messages from the other communication protocol stacks in the group of communication protocol stacks. Preferably, the location information comprises at least one of routing address information associated with the communication protocol stack and data processing information associated with the communication protocol stack. More preferably, the routing address information comprises an Internet Protocol address range associated with the communication protocol stack.

In a still further embodiment of the present invention, where the generated connection information is provided from the first communication protocol stack to an application associated with the first communication protocol stack, the application may modify the communication protocol utilized in sending information over the connection based on the provided generated connection information. For example, a common memory area may be utilized rather than the connection if the generated connection information indicates that the connection is within the same data processing system in the cluster. Furthermore, the application may retain the generated connection information at the application so that if the application need to re-establish the connection to the destination, during a subsequent communication the connection may be re-established based on the retained generated connection information so as to assure that the connection will be within the group.

In a further embodiment of the present invention, data may be transmitted by the application over the connection in non-canonical form if the generated connection information indicates that the connection is within the group. Furthermore, data may be transmitted over the connection utilizing an unsecured communication protocol if the generated connection information indicates that the connection is within the group. In addition, character translation may be avoided if the character translation is not required to communication with other data processing systems in the group.

While the invention has been described above primarily with respect to the method aspects of the invention, both systems and/or computer program products are also provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention may also be written in conventional procedural programming languages, such as the "C" programming language or object oriented languages such as "C++". The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN)

or a wide area network (WAN), or the connection may be made to an external computer (for example, through the Internet using an Internet Service Provider).

The present invention is described below in part with reference to flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The present invention can be embodied as systems, methods, and/or computer program products which provide connection information about connections to communication protocol stacks in data processing systems by distributing location information between communication protocol stacks in a group of stacks. The distributed location information about addresses and operating system images or data processing systems of communication protocol stacks is utilized to generate a list of addresses corresponding to stacks in the group so that this information may be provided to applications requesting the information from the communication protocol stacks. The groups may be based on a trusted relationship between the communication protocol stacks such as knowledge that connections between particular data processing systems is secure. Preferably, the communication protocol stacks are in data processing systems in a cluster of data processing systems, however, the present invention should not be construed as limited to clusters of data processing systems but may be utilized in different environments. For example, the present invention may be suitable for use in systems which group communication protocol stacks based on whether the connections are within a local area network or across the Internet. Thus, while the present invention is described with reference to a cluster of data processing systems, the present invention should not be construed as limited to such.

Figure 1:
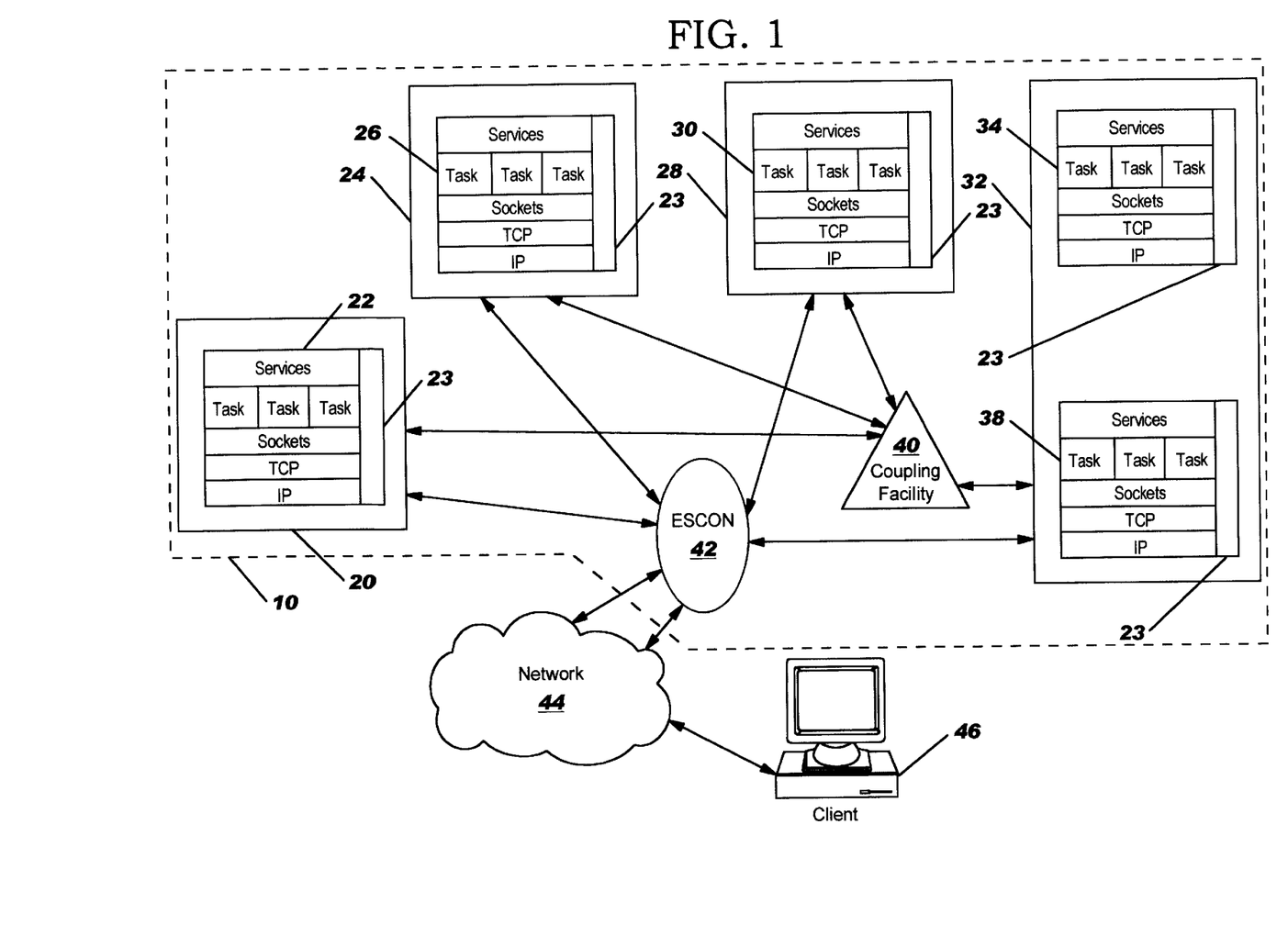
FIG. 1 is block diagram of a cluster of data processing systems incorporating the present invention.

FIG. 1 illustrates one system incorporating an embodiment of the present invention. A cluster of data processing systems is illustrated in FIG. 1 as a cluster nodes in Sysplex 10. As seen in FIG. 1, several data processing systems 20, 24, 28 and 32 are interconnected in a Sysplex 10. The data processing systems 20, 24, 28, and 32 illustrated in FIG. 1 may be operating system images, such as MVS images, executing on one or more computer systems. While the present invention will be described primarily with respect to the MVS operating system executing in an OS/390 environment, the data processing systems 20, 24, 28, and 32 may be mainframe computers, mid-range computers, servers or other systems capable of supporting the group formation and distribution of address information described herein. Thus, for example, a group may be formed around any collection of processing systems by which connectivity information may be discovers, such as in a virtual private network (VPN). Accordingly, the present invention should not be construed as limited to the Sysplex environment described herein.

As is further illustrated in FIG. 1, the data processing systems 20, 24, 28 and 32 have associated with them communication protocol stacks 22, 26, 30, 34 and 38, which may be TCP/IP stacks. As is further seen in FIG. 1, data processing system 32 incorporates two communication protocol stacks 34 and 38. The communication protocol stacks 22, 26, 30, 34 and 38 have been modified to incorporate a group formation and connection information distribution function 23 as described herein for automatically distributing connection information between communication protocol stacks within the group. Preferably, connection information distribution function 23 is incorporated as part of the sockets layer of the communication protocol stack and, therefore, may be readily incorporated into existing communication protocol stacks.

While each of the communication protocol stacks 22, 26, 30, 34 and 38 illustrated in FIG. 1 incorporate the group formation and connection information distribution function 23, not all communication protocol stacks in a Sysplex need incorporate the group formation and connection information distribution function 23. Thus, the present invention may be carried out on any system where two or more communication protocol stacks in a cluster of data processing systems support group formation and connection information distribution. If a communication protocol stack does not support group formation and connection information distribution, then the group formation and connection information distribution messages according to the present invention can be ignored by the communication protocol stack. Thus, the present invention provide can backward compatibility with existing communication protocol stacks.

As is further seen in FIG. 1, the communication protocol stacks 22, 26, 30, 34 and 38 may communicate with each other through a coupling facility 40 of the Sysplex 10, for example, utilizing XCF messaging. Furthermore, the communication protocol stacks 22, 26, 30, 34 and 38 may communicate with an external network 44 such as the Internet, an intranet, a Local Area Network (LAN) or Wide Area Network (WAN) utilizing the Enterprise System Connectivity (ESCON) 42 or other facility for cluster connectivity. Thus, a client 46 may utilize network 44 to communicate with an application executing on an MVS image in Sysplex 10 through the communication protocol stacks 22, 26, 30, 34 and 38.

Each of the communication protocol stacks 22, 26, 30, 34 and 38 has associated with it a home list of addresses, such as IP addresses, for which the communication protocol stack 22, 26, 30, 34 and 38 is responsible. As will be appreciated by those of skill in the art, the IP addresses of the communication protocol stacks are mutually exclusive in that no two communication protocol stacks 22, 26, 30, 34 and 38 will be assigned the same IP addresses. Also, each data processing system 20, 24, 28 and 32 or MVS image has associated with it a unique identifier within the sysplex 10. At initialization of the communication protocol stacks 22, 26, 30, 34 and 38 the communication protocol stacks are configured with which addresses are in the home list of the communication protocol stack 22, 26, 30, 34 and 38 and are provided with the identifier of the MVS image or data processing system 20, 24, 38 and 32.

Also, each communication protocol stack 22, 26, 30, 34 and 38 incorporating the group formation and connection information distribution function 23 is configured with an identifier as to group associated with the communication protocol stack. This group identifier specifies which group the communication protocol stack 22, 26, 30, 34 and 38 should join at initialization. The groups may be determined at configuration time by a system administrator and may be based on any criteria associated with the communication protocol stack. For example, the communication protocol stacks 22, 26, 30, 34 and 38 in a group may be based on the communication protocol stacks 22, 26, 30, 34 and 38 being in the same sysplex 10. Alternatively, the groups may be based on other criteria such as the type of connection between the communication protocol stacks 22, 26, 30, 34 and 38. Thus, for example, even if a communication protocol stack 22, 26, 30, 34 and 38 is in the same sysplex 10 it may be excluded from the group based on other criteria such as the security of the connection between the communication protocol stack 22, 26, 30, 34 and 38 and other communication protocol stacks 22, 26, 30, 34 and 38 in the sysplex 10. Thus, many different criteria may be utilized for determining which communication protocol stacks 22, 26, 30, 34 and 38 to include in a group according to the present invention.

Furthermore, different groups could be established such that a communication protocol stack 22, 26, 30, 34 and 38 could be in multiple groups. Thus, a communication protocol stack could provide connection information to applications which indicated which group the connection was made to or if it was made to a communication protocol stack in a group. Accordingly, different types of information may be conveyed to the application by having different groups with common characteristics such that membership in the group implied the presence of the common characteristic. For example, different security groups could be specified and dynamically configured during operation where the members of the group would leave the group when a secure connection between members was no longer available. Also different groups could be established based on security level such that the members of the group were at the same level of security.

Alternatively, if a single group identifier is utilized, the group identifier could be static and included in the group formation and connection information distribution function 23 such that all communication protocol stacks in a sysplex with the group information and connection information distribution function 23 would be in the group. Thus, in one embodiment of the present invention a static group is formed while in other embodiments of the present invention dynamic groups may be formed either at configuration time or at run time by specifying to the group formation and information distribution function 23 a group to which the communication protocol stack should join. As described below with regard to joining and leaving groups, the group in which a communication protocol stack was a member could be changed during operation by the communication protocol stack leaving a group and joining another.

Figure 2:
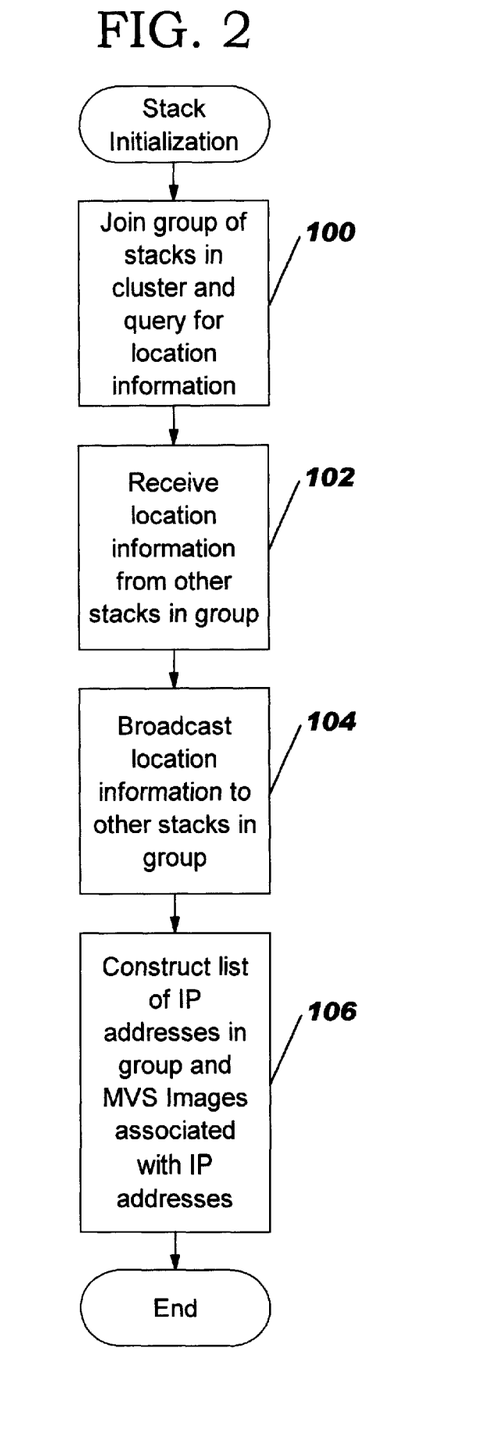
FIG. 2 is a flowchart illustrating operations for initialization of a communication protocol stack incorporating the present invention.

The present invention will now be described with reference to flow charts of FIGS. 2 through 5 which illustrate operations of a communication protocol stack 22, 26, 30, 34 and 38 incorporating the group formation and connection information distribution function 23 of an illustrative embodiment of the present invention. As is seen in FIG. 2, at initialization a communication protocol stack 22, 26, 30, 34 and 38 joins the group specified by the group identifier of the communication protocol stack 22, 26, 30, 34 and 38 and queries the other members of the group for address information of the other members (block 100). Such a group joining may be accomplished by broadcasting a join message to the other members of the group or by notifying a group management facility such as the coupling facility 40 of the desire to join the group.

After joining the group and querying for address lists from other members of the group, the communication protocol stack 22, 26, 30, 34 and 38 receives messages from other members of the group which include the data processing system identifier, for example an MVS image identifier, and the home list of addresses, such as IP addresses, associated with the other members of the group (block 102). The communication protocol stack 22, 26, 30, 34 and 38 joining the group also broadcasts a message containing its data processing system identifier and address home list to the other members of the group (block 104).

After receiving the address and data processing system information from the other members of the group, the communication protocol stack 22, 26, 30, 34 and 38 joining the group constructs a list of addresses and data processing systems associated with members in the group (block 106). Preferably, this list is maintained as two tables, a table of addresses associated with group members and a table of group members. The table of group members preferably includes for each member of the group the data processing system identifier (CPName), an identifier of the communication protocol stack (TCP Name), a coupling facility (XCF) token associated with the group member and the number of supported IP addresses which may be used to limit searches when the address table is updated by terminating the update process when the supported number of addresses is reached. The address table preferably includes the IP address and a pointer to the entry in the group member table associated with the IP address. These tables may then be used as described below for generating connection information for connections associated with any connection in the group.

Figure 3:
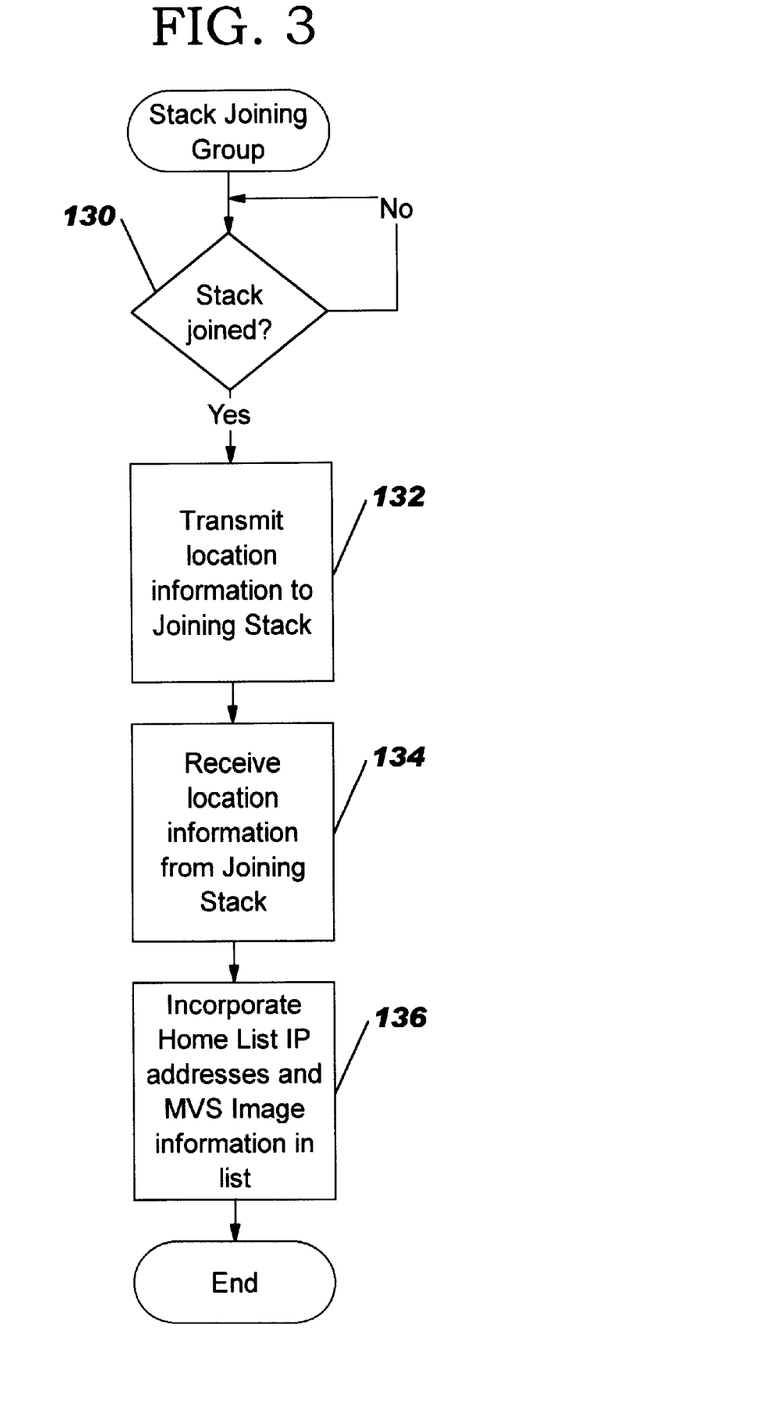
FIG. 3 is a flowchart illustrating operations of a communication protocol stack according to the present invention upon receiving a notification of a communication protocol stack joining the group of communication protocol stacks.

FIG. 3 illustrates operations of other members of the group when a communication protocol stack 22, 26, 30, 34 and 38 joins the group. As seen in FIG. 3, when a communication protocol stack 22, 26, 30, 34 and 38 joins the group, (block 130), the other members of the group transmit their home list and their data processing system identifier, such as the MVS image identifier, to the joining communication protocol stack (block 132). The join and query of the group by the new communication protocol stack 22, 26, 30, 34 and 38 may include an XCF token which allows the members of the group to directly send their home list and data processing identifier to the joining communication protocol stack 22, 26, 30, 34 and 38. The other members of the group also receive from the joining communication protocol stack 22, 26, 30, 34 and 38 its home list and data processing system identifier (block 134). The home list and data processing system identifier of the joining communication protocol stack may be broadcast to all other members of the group. The other members of the group then utilize the received information to update their list of addresses and data processing information (block 136). For example, the group member table may be updated to include the new CPName, TCP Name, XCF token and current address limit of the new communication protocol stack 22, 26, 30, 34 and 38. Furthermore, the address table may be updated to include the range of addresses in the home list of the joining communication protocol stack 22, 26, 30, 34 and 38.

Figure 4:
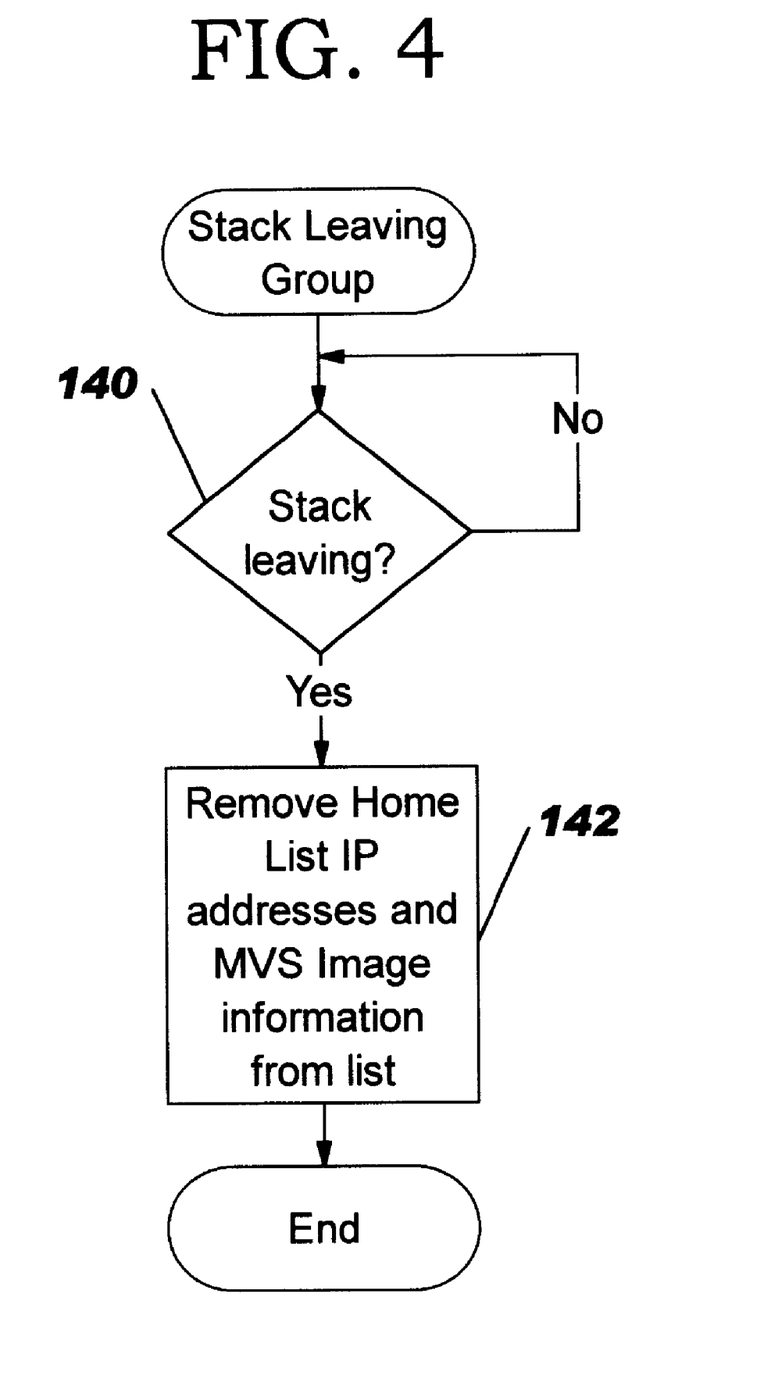
FIG. 4 is a flowchart illustrating operations of a communication protocol stack according to the present invention upon receiving a notification of a communication protocol stack leaving the group of communication protocol stacks.

FIG. 4 illustrates operations according to the present invention when a communication protocol stack 22, 26, 30, 34 and 38 leaves the group. As seen FIG. 4, when leaving the group a communication protocol stack 22, 26, 30, 34 and 38 notifies the other members of the group that it is leaving (block 140). When the communication protocol stack 22, 26, 30, 34 and 38 leaves the other members of the group remove the communication protocol stack and its associated addresses from their lists of addresses and data processing systems in the group (block 142). Such a removal of a communication protocol stack 22, 26, 30, 34 and 38 may be accomplished by, for example, deleting all addresses from the address table which have pointers to the departing communication protocol stack 22, 26, 30, 34 and 38. As described above, this deletion may be accomplished by searching the address table for pointers to the departing communication protocol stack 22, 26, 30, 34 and 38 until the number of addresses specified as the maximum address for the communication protocol stack 22, 26, 30, 34 and 38 have been deleted. Furthermore, the reference to the departing group member may also be deleted from the group member table.

Furthermore, in addition to the operations illustrated in FIGS. 2 through 4, if a communication protocol stack's home list is modified or changes after it has joined the group, then this information is also distributed to the other members of the group. Thus, the communication protocol stack 22, 26, 30, 34 and 38 whose home list has changed sends a refresh message to the other members of the group. When a member of the group receives a refresh message, the member updates its list to reflect the new information. Thus, for example, the address table and group member tables may be updated to correspond to a new home list of a group member. Thus, by distributing changes to the information about a communication protocol stack 22, 26, 30, 34 and 38 in the group to other members in the group each member of the group may maintain current information about the other members of the group.

Figure 5:
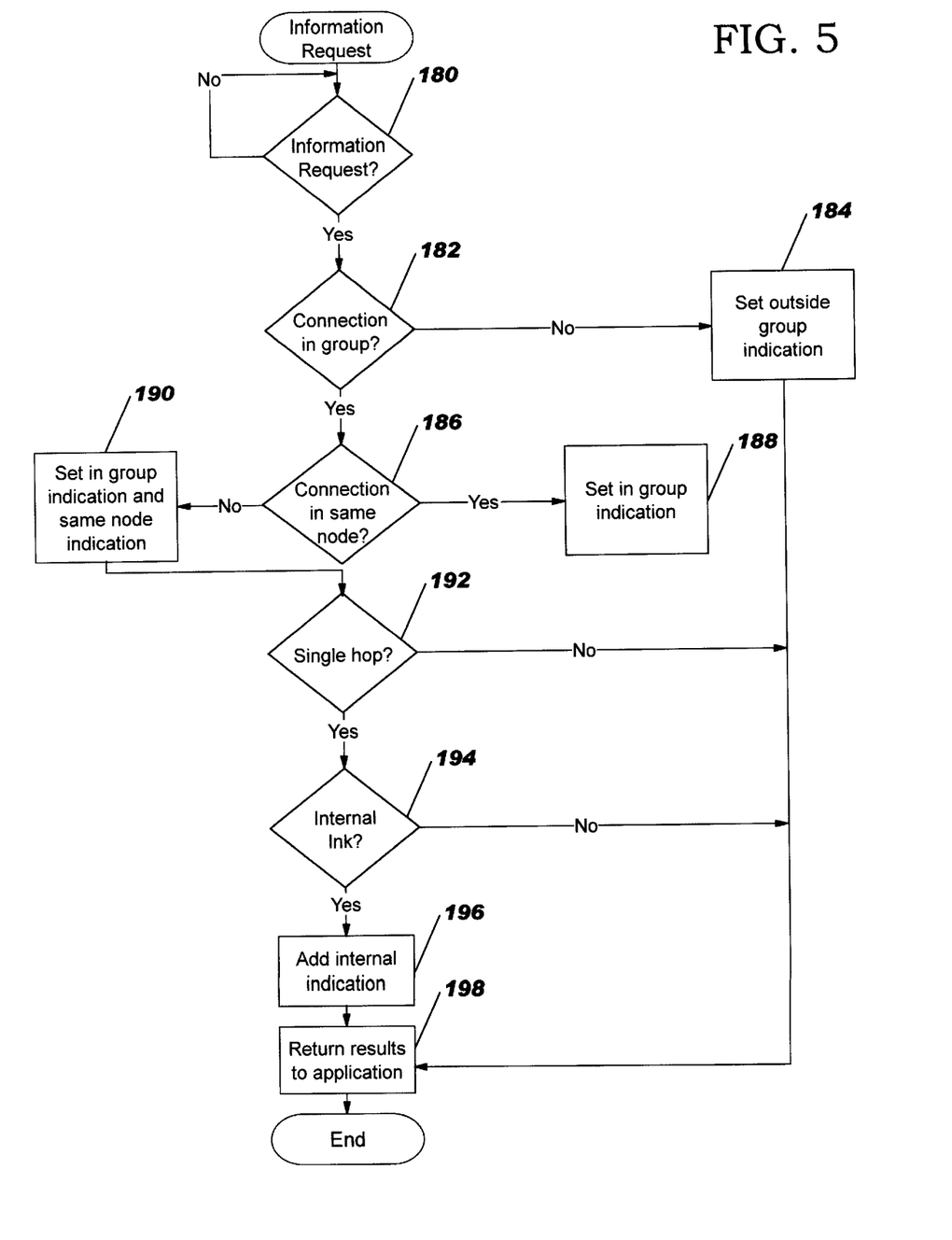
FIG. 5 is a flowchart illustrating operations responding to a request for connection information from an application according to the present invention.

FIG. 5 illustrates operations of the present invention when a request is made by an application for information about a connection. As seen in FIG. 5, the communication protocol stacks 22, 26, 30, 34 and 38 wait for requests for information from associated applications (block 180). Upon receipt of the request for information, the communication protocol stacks determine if the connection is to a protocol stack within the group (block 182). If the connection is not to a communication protocol stack within the group, then an indication that the connection is not within the group is set for the response to the application (block 184).

A determination of whether the connection is within the group may be made by determining if both the source and the destination address of the connection are addresses of communication protocol stacks in the group. Such a determination may be made by determining if at least one of the source or the destination address in the list of addresses within the group (block 182). If the connection about which the request is made is a connection to the communication protocol stack 22, 26, 30, 34 and 38 receiving the communication request, then the communication protocol stack 22, 26, 30, 34 and 38 searches the address table for the one of the source or destination address which is not associated with the communication protocol stack 22, 26, 30, 34 and 38 receiving the request for information to determine if the connection is within the group. Alternatively, if the address table includes the home list of the communication protocol stack 22, 26, 30, 34 and 38 receiving the request, the address table could be searched for both the source and the destination address to determine if the connection is between two communication protocol stacks 22, 26, 30, 34 and 38 within the group. However accomplished, if the address search results in a determination that the single hop is not within the group, then the indication that the connection is outside the group is set in the response to return to the requesting application (block 184). If the connection is not within the group, then no further analysis need be done and the response may be provided to the requesting application (block 198).

If the connection is within the group (block 186), then it is determined if the connection is between two communication protocol stacks 22, 26, 30, 34 and 38 which are within the same data processing system or node (block 188). For example, as illustrated in FIG. 1, communication protocol stack 34 and communication protocol stack 38 are within the same data processing system 32. Such a determination may be made by, for example, using an address associated with the connection, to locate an address in the address table and then evaluating the group member table entry pointed to by the address in the address table. Thus, for example, if the home list of the communication protocol stack 22, 26, 30, 34 and 38 receiving the request is included in the address table, then the source and destination addresses could be looked up in the address table and the CPNames compared for the group member table entries associated with the addresses. If the CPName entries are the same, then the hop of the connection is between two communication protocol stacks in the same data processing system or MVS image. If the CPNames are not the same the connection is to another data processing system in the group.

Alternatively, because each communication protocol stack 22, 26, 30, 34 and 38 knows its own data processing system identifier and address home list, the address associated with the connection which is not in the home list of the communication protocol stack 22, 26, 30, 34 and 38 receiving the information request could be searched for in the address table. The data processing system identifier in the group member table entry corresponding to the address could then be compared to the data processing system identifier of the communication protocol stack 22, 26, 30, 34 and 38 receiving the request for information. If the two match, then the communication is between to communication protocol stacks 22, 26, 30, 34 and 38 within the same data processing system.

If the connection is not within the same node (block 186), then an indication that the connection is within the same group is set in the response to the requesting application (block 188). However, if the connection is within the same node, then both the in group and same node responses are set (block 190). In either case, it is then determined if the connection is a single hop connection (block 192). This information may be determined from the routing information provided to the communication protocol stacks 22, 26, 30, 34 and 38 upon establishing the connection. If the connection is not a single hop, then no further analysis need be done and the response may be provided to the requesting application (block 198).

If the connection is a single hop connection, then it is determined if the connection is via an internal link within the same communication protocol stack 22, 26, 30, 34 and 38 (block 194). This determination may be made by determining if both the source and the destination address are in the home list of the communication protocol stack 22, 26, 30, 34 and 38 receiving the request for information. Alternatively, if the addresses are looked up in the address table, the group member entries corresponding to the source and destination addresses could be compared to determine if the TCP Name is the same for the two entries. Alternatively, a comparison of the pointers in the addresses could be made if there is a unique entry in the group member table for each communication protocol stack 22, 26, 30, 34 and 38. If the source and destination addresses of the connection indicate that the connection is an internal connection within a single communication protocol stack 22, 26, 30, 34 and 38, then an "internal" indication is set in the response to be provided to the requesting application (block 196). In any event, the response may then be provided to the requesting application with the appropriate indication set (block 198).

Figure 6:
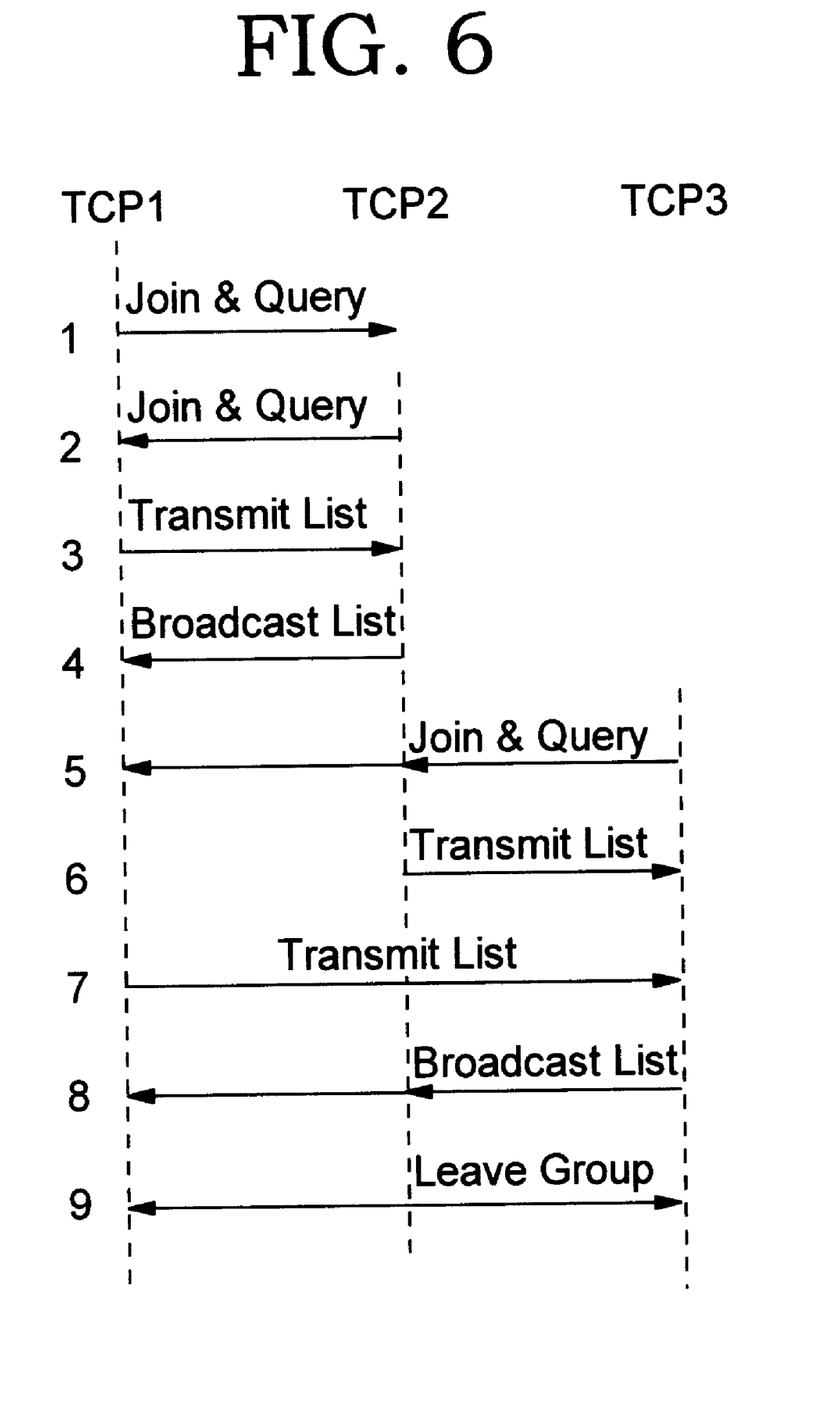
FIG. 6 is a flow diagram illustrating an example communication sequence of communication protocol stacks according to the present invention.

An example of messages exchanged between communication protocol stacks, such as communication protocol stacks 22, 26, 30, 34 and 38, to establish a group and to distribute information between members of the group is seen in FIG. 6. As seen in FIG. 6 when the first communication protocol stack TCP1 is initialized, at time 1 it sends messages to a connection facility to join a group and to query other members of the group for address and data processing system information. Because TCP1 is the first member of the group, there is no response. However, at time 2, TCP2 is initialized sufficiently (as indicated by the start of the dashed vertical line below TCP2) so that TCP2 joins the group and queries the other members of the group for information. In response to the query, at time 3 TCP1 transmits its home list and data processing information to TCP2. At time 4, TCP2 broadcasts its home list and data processing information to all other members of the group.

At time 5, TCP3 is initialized sufficiently (as indicated by the start of the dashed vertical line below TCP3) so that TCP3 joins the group and queries the group members for information. In response, at time 6 TCP2 transmits its home list and data processing system information to TCP3 and at time 7 TCP1 transmits its home list and data processing system information to TCP3. At time 8, TCP3 broadcasts its home list and data processing system information to the other members of the group. While not illustrated in FIG. 6, if the transmitted information for TCP1, TCP2 or TCP3 were to change, then they would rebroadcast their information to other members of the group.

The broadcast of the leave message at time 9 by TCP2 illustrates the message transmitted when a communication protocol stack leaves the group. As illustrated by the termination of the dashed line below TCP2, after leaving the group, TCP2 is no longer considered a member of the group and TCP1 and TCP3 would remove references to TCP2 from their respective lists of group member information.

While the present invention has been described with respect to considering only single hop connections as connections within the group, as will be appreciated by those of skill in the art, if complete routing information is available to each member of the group, multiple hop connections may be identified as within the group if all of the hops in the route are within the group.

While the present invention has been described with respect to the group formation and information distribution function as a part of the communication protocol stack, as will be appreciated by those of skill in the art, such functions may be provided as separate functions, objects or applications which may cooperate with the communication protocol stacks. Furthermore, the present invention has been described with reference to particular sequences of operations. However, as will be appreciated by those of skill in the art, other sequences may be utilized while still benefitting from the teachings of the present invention. Thus, while the present invention is described with respect to a particular division of functions or sequences of events, such divisions or sequences are merely illustrative of particular embodiments of the present invention and the present invention should not be construed as limited to such embodiments.

Furthermore, while the present invention has been described with reference to particular embodiments of the present invention in an OS/390 environment, as will be appreciated by those of skill in the art, the present invention may be embodied in other environments and should not be construed as limited to OS/390 but may be incorporated into other systems, such as a Unix or other environment where group connectivity information may provide efficiencies in communications. For example, in the Unix environment, data processing systems could use code page commonality to avoid translation overhead. Thus, the present invention may be suitable for use in any collection of data processing systems which may incorporate communication protocol stacks which may communicate with one another so as to form groups and provide that group information to applications executing on the associated data processing systems. Accordingly, specific references to OS/390 systems or facilities, such as the "coupling facility," should not be construed as limiting the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of generating connection information associated with a connection from a first communication protocol stack, the method comprising the steps of:

establishing a group of communication protocol stacks associated with a cluster of data processing systems wherein the first communication protocol stack is in the group of communication protocol stacks;

distributing location information between the first communication protocol stack and other communication protocol stacks in the group of communication protocol stacks so as to provide location information to each communication protocol stack in the group of communication protocol stacks which identifies the location of each communication protocol stack in the group of communication protocol stacks;

generating, at the first communication protocol stack, a list of locations which are associated with the group of communication protocol stacks based on the distributed location information;

determining if the connection from the first communication protocol stack is to a location in the list of locations which are associated with the group of communication protocol stacks; and generating connection information specifying the connection as within the group of communication protocol stacks if it is determined that the connection from the first communication protocol stack is to a location in the list of locations.

2. A method according to claim 1, wherein the location information comprises routing addresses associated with communication protocol stacks in the group of communication protocol stacks, wherein the generating step comprises the step of generating a list of routing addresses associated with the group of communication protocol stacks based on the distributed location information, and wherein the determining step comprises the step of determining if at least one of a source and a destination routing address associated with the connection are included in the list or routing addresses.

3. A method according to claim 2, wherein the determining step further comprises determining if a route associated with the connection is a one hop route.

4. A method according to claim 2, wherein the location information further comprises a data processing system identifier associated with communication protocol stacks in the group of communication protocol stacks, wherein the generating step further comprises the step of generating a list of data processing systems associated with the group of communication protocol stacks based on the distributed location information, and wherein the determining step further comprises the step of determining if both a source and a destination routing address associated with the connection are associated with a same data processing system.

5. A method according to claim 4, wherein the data processing system information comprises an MVS image identifier.

6. A method according to claim 1, wherein the distributing step carried out by the first communication protocol stack comprises the steps of:

joining the group of communications protocol stacks;

broadcasting to other communication protocol stacks in the group of communication protocol stacks a location information message containing location information associated with the first communication protocol stack; and receiving, at the first communication protocol stack, location information messages from the other communication protocol stacks in the group of communication protocol stacks.

7. A method according to claim 6, wherein the location information comprises at least one of routing address information associated with the communication protocol stack and data processing information associated with the communication protocol stack.

8. A method according to claim 7, wherein the routing address information comprises an Internet Protocol address range associated with the communication protocol stack.

9. A method according to claim 7, wherein the data processing information comprises an MVS image identifier associated with the communication protocol stack.

10. A method according to claim 1, further comprising the step of returning the connection information to an application associated with the first communication protocol stack in response to receiving a request for connection information from the application.

11. A method according to claim 1, wherein the step of establishing comprises establishing a plurality of groups of communication protocol stacks associated with a cluster of data processing systems wherein the first communication protocol stack is in at least two of the plurality of groups of communication protocol stacks;

wherein the distributing step comprises distributing location information between the first communication protocol stack and other communication protocol stacks in the at least two groups of communication protocol stacks so as to provide location information to each communication protocol stack in the at least two group of communication protocol stacks which identifies the location of each communication protocol stack in the corresponding group of the at least two groups of communication protocol stacks;

wherein the step of generating a list comprises generating, at the first communication protocol stack, lists of locations which are associated with each of the at least two groups of communication protocol stacks based on the distributed location information;

wherein the determining step comprises determining if the connection from the first communication protocol stack is to a location in the lists of locations which are associated with the at least two groups of communication protocol stacks; and where the step of generating connection information comprises the step of generating connection information specifying the connection as within the group of the at least two groups of communication protocol stacks if it is determined that the connection from the first communication protocol stack is to a location in the list of locations corresponding to the group of the at least two groups.

12. A method according to claim 1, further comprising the steps of:

providing the generated connection information from the first communication protocol stack to an application associated with the first communication protocol stack; and wherein the application carries out the steps of:

modifying the communication protocol utilized in sending information over the connection based on the provided generated connection information.

13. A method according to claim 12, wherein the step of modifying comprises the steps of:

communicating utilizing a common memory area if the generated connection information indicates that the connection is within the same data processing system in the cluster.

14. A method according to claim 12, further comprising the steps of:

retaining the generated connection information at the application; and re-establishing the connection during a subsequent communication based on the retained generated connection information so as to assure that the connection will be within the group.

15. A method according to claim 12, wherein the step of modifying comprises the step of transmitting data over the connection in non-canonical form if the generated connection information indicates that the connection is within the group.

16. A method according to claim 12, wherein the step of modifying comprises the step of transmitting data over the connection utilizing an unsecured communication protocol if the generated connection information indicates that the connection is within the group.

17. A method according to claim 1, wherein the generated connection information comprises an indication of at least one or whether the connection is within the group, whether the connection is within the same data processing system and whether the connection is within the first communication protocol stack.

18. A system for generating connection information associated with a connection from a first communication protocol stack, comprising:

means for establishing a group of communication protocol stacks associated with a cluster of data processing systems wherein the first communication protocol stack is in the group of communication protocol stacks;

means for distributing location information between the first communication protocol stack and other communication protocol stacks in the group of communication protocol stacks so as to provide location information to each communication protocol stack in the group of communication protocol stacks which identifies the location of each communication protocol stack in the group of communication protocol stacks;

means for generating, at the first communication protocol stack, a list of locations which are associated with the group of communication protocol stacks based on the distributed location information;

means for determining if the connection from the first communication protocol stack is to a location in the list of locations which are associated with the group of communication protocol stacks; and means for generating connection information specifying the connection as within the group of communication protocol stacks if it is determined that the connection from the first communication protocol stack is to a location in the list of locations.

19. A computer program product for generating connection information associated with a connection from a first communication protocol stack, comprising:

a computer readable storage medium having computer readable program code embodied in said medium, said computer readable program code comprising:

computer readable code for establishing a group of communication protocol stacks associated with a cluster of data processing systems wherein the first communication protocol stack is in the group of communication protocol stacks;

computer readable code for distributing location information between the first communication protocol stack and other communication protocol stacks in the group of communication protocol stacks so as to provide location information to each communication protocol stack in the group of communication protocol stacks which identifies the location of each communication protocol stack in the group of communication protocol stacks;

computer readable code for generating, at the first communication protocol stack, a list of locations which are associated with the group of communication protocol stacks based on the distributed location information;

computer readable code for determining if the connection from the first communication protocol stack is to a location in the list of locations which are associated with the group of communication protocol stacks; and computer readable code for generating connection information specifying the connection as within the group of communication protocol stacks if it is determined that the connection from the first communication protocol stack is to a location in the list of locations.

* * * * *